US007815989B2

(12) United States Patent
Cheich

(10) Patent No.: US 7,815,989 B2
(45) Date of Patent: Oct. 19, 2010

(54) SELECTIVELY TEARABLE STOCK MATERIAL FOR A DUNNAGE CONVERSION MACHINE

(75) Inventor: Robert C. Cheich, Independence, OH (US)

(73) Assignee: Ranpak Corp., Concord Township, OH (US)

( * ) Notice: Subject to any disclaimer, the term of this patent is extended or adjusted under 35 U.S.C. 154(b) by 572 days.

(21) Appl. No.: 11/909,239

(22) PCT Filed: Mar. 23, 2006

(86) PCT No.: PCT/US2006/010495

§ 371 (c)(1),
(2), (4) Date: Sep. 20, 2007

(87) PCT Pub. No.: WO2006/102464

PCT Pub. Date: Sep. 28, 2006

(65) Prior Publication Data

US 2010/0160132 A1 Jun. 24, 2010

Related U.S. Application Data

(60) Provisional application No. 60/664,455, filed on Mar. 23, 2005.

(51) Int. Cl.
*B32B 3/10* (2006.01)

(52) U.S. Cl. ........................................................ 428/43

(58) Field of Classification Search .................... 428/43
See application file for complete search history.

(56) References Cited

U.S. PATENT DOCUMENTS

| | | | | |
|---|---|---|---|---|
| 4,096,306 | A | 6/1978 | Larson | |
| 6,019,715 | A | 2/2000 | Ratzel et al. | |
| 6,228,454 | B1 * | 5/2001 | Johnson et al. | 428/43 |
| 6,277,459 | B1 * | 8/2001 | Lencoski et al. | 428/43 |
| 6,676,589 | B2 | 1/2004 | Kung et al. | |
| 2004/0052988 | A1 | 3/2004 | Slovencik et al. | |
| 2004/0266598 | A1 | 12/2004 | Toth | |

FOREIGN PATENT DOCUMENTS

| | | |
|---|---|---|
| DE | 36 01 520 | 10/1986 |
| WO | 95/35246 | 12/1995 |
| WO | 2005/007394 | 1/2005 |

OTHER PUBLICATIONS

International Search Report of International Application No. PCT/US2006/010495, published as International Publication No. WO 2006/102464 A1.

* cited by examiner

*Primary Examiner*—Alexander Thomas
(74) *Attorney, Agent, or Firm*—Renner, Otto, Boisselle & Sklar, LLP

(57) ABSTRACT

A stock material (16) for use with a dunnage conversion machine (14) includes at least one ply of sheet material having spaced along the length thereof a plurality of transverse rows (22) of weakened areas (24). The weakened areas (24), which can be formed by perforations, for example, have a reduced strength relative to adjacent portions of the sheet material. Each row (22) of weakened areas (24) has at least one parameter that varies along the row (22). The strength of the stock material at the row (22), in response to a force applied across the row (22), varies across the stock material (16).

10 Claims, 3 Drawing Sheets

SELECTIVELY TEARABLE STOCK MATERIAL FOR A DUNNAGE CONVERSION MACHINE

This invention claims the benefit of International Application No. PCT/US2006/010495, filed Mar. 23, 2006, published in English as Publication No. WO 2006/102464, which the claims the benefit of U.S. Patent Application No. 60/664,455, filed Mar. 23, 2005, both of which are hereby incorporated herein by reference.

FIELD OF THE INVENTION

This invention relates generally to a selectively tearable stock material for use with a dunnage conversion system, as well as a dunnage conversion system and method for converting the tearable stock material into a dunnage product.

BACKGROUND

In the process of transporting an article from one location to another, a dunnage product typically is placed in a container to fill any voids around the article and/or to cushion the article during the transportation process. By their nature, dunnage products typically are relatively less dense than the stock material from which they are formed. Consequently, it can be more efficient to ship a stock material from a remote location for local storage and conversion to relatively less dense dunnage products.

Many suitable dunnage products can be produced from a sheet stock material, such as paper or plastic. These exemplary sheet stock materials can be provided in the form of a roll or a fan-folded stack, and can have one or more plies or layers or both. A conversion machine typically pulls the stock material from the roll or stack for conversion into a dunnage product as needed. Exemplary dunnage conversion machines are disclosed in U.S. Pat. Nos. 6,019,715; 6,277,459 and 6,676,589. The entire disclosures of these patents are hereby incorporated herein by reference.

SUMMARY

In some previous conversion machines, stock material uniformly perforated across its width had a tendency to tear at the perforations prematurely. At times this led to unsightly dunnage products or jamming of the conversion machine.

The present invention provides a stock material for a dunnage conversion system and a method of using that stock material to produce a dunnage product. The stock material includes at least one ply of sheet material having a plurality of transversely-extending, longitudinally spaced-apart rows of perforations or other types of weakened areas. The weakened areas have a reduced strength relative to adjacent portions of the sheet material. Each row of weakened areas has at least one parameter that varies along the row. Thus the strength of the stock material at the row, in response to a force applied across the row, varies across the stock material.

A stock material provided by the present invention can be tailored to a particular conversion process to ensure that the stock material is converted into a strip of dunnage without jamming the machine or tearing prematurely, while still facilitating the separation of discrete dunnage products from the strip.

An exemplary stock material includes rows of perforations as weakened areas. The perforations can be uniform across the majority of the width, but the lateral edges of the stock material are perforation-free. For example, in one embodiment approximately ¼ inch to 1½ inches (about 0.5 cm to about 3.75 cm), and more particularly approximately ½ inch to 1 inch (about 1.25 cm to about 2.5 cm) of at least one lateral edge of the stock material is free of perforations or any other form of weakened areas. Since tension on the stock material as it is being drawn into a conversion machine is often highest at the lateral edges, the lack of weakened areas at the edges helps to minimize or prevent inadvertent tearing, and subsequent tear propagation, at the rows of weakened areas before the conversion process is complete.

The foregoing and other features of the invention are hereinafter fully described and particularly pointed out in the claims. The following description and annexed drawings set forth in detail certain illustrative embodiments of the invention, these embodiments being indicative, however, of but a few of the various ways in which the principles of the invention can be employed.

DETAILED DESCRIPTION

Figure 1:
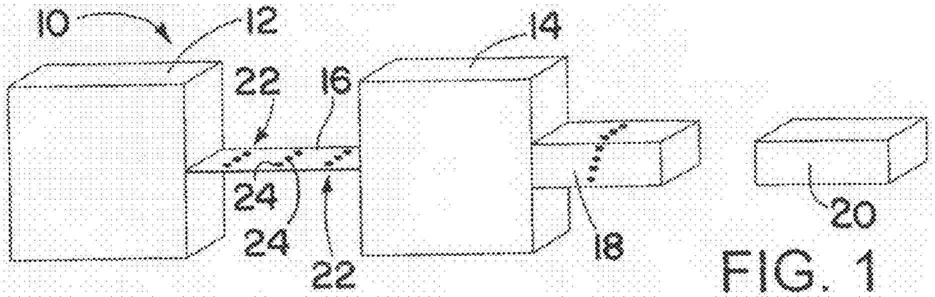
FIG. 1 is a schematic illustration of a dunnage conversion system in accordance with the present invention that includes a dunnage conversion machine and a supply of stock material.

Referring now to the drawings in detail, a schematic view of a dunnage conversion system 10 in accordance with the present invention is shown in FIG. 1. The system 10 includes a supply 12 of sheet stock material for use with a dunnage conversion machine 14. The conversion machine 14 can convert the sheet stock material 16 into a relatively less dense strip of dunnage 18 from which a discrete dunnage product 20 can be separated. The stock material 16 has spaced along the length thereof a plurality of transverse rows 22 of weakened areas 24 that facilitate separating the stock material 16 along the row 22, yet minimize separation along the row 22 during the conversion process.

The strength of the stock material 16 transverse each row 22 typically is weakened relative to the non-weakened areas of the stock material by one or more perforations, watermarks, cutting, burning, chemically altering, etching, or other means for weakening parts of the stock material or strengthening other parts of the stock material. The perforations or other types of weakening do not have to be the same in each row. The rows 22 (FIG. 1) of weakened areas 24 form tear lines along which the stock material can be selectively torn, typically at the end of the conversion process, to separate discrete lengths of dunnage.

Each row 22 of perforations or other types of weakened areas 24 has at least one parameter that varies along the row 22. As a result, the strength of the stock material at the row 22, in response to a force applied across the row 22, varies across the width of the stock material 12. Thus the weakened areas 24 in each row 22 can be tailored to a particular conversion process or conversion machine to ensure that the stock material 16 is converted into a strip of dunnage 18 without tearing prematurely and/or jamming the conversion machine 14 during conversion. The perforations or other types of weakened areas 24 facilitate separating discrete dunnage products 20 from the resulting strip of dunnage 18, however, at the end of the conversion process. The rows 22 (FIG. 1) of weakened areas 24 thus can form tear lines along which the stock material can be selectively torn, typically after the conversion of the stock material into a strip of dunnage to provide discrete dunnage products.

Figure 2:
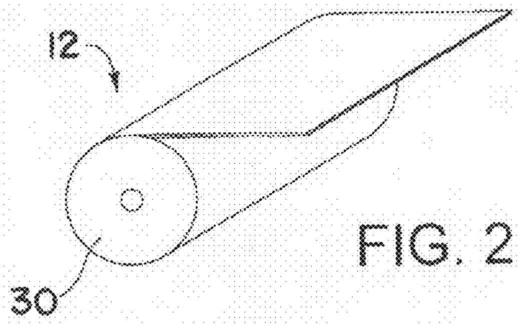
FIG. 2 is a perspective view of a roll of sheet stock material for use in the dunnage conversion system of FIG. 1 in accordance with the present invention.
Figure 3:
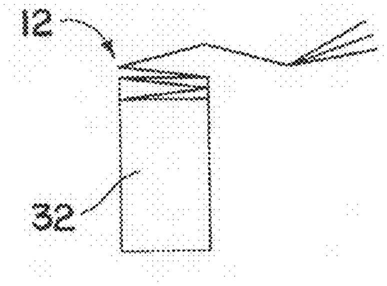
FIG. 3 is a schematic side view of a stack of fan-folded multi-ply sheet stock material for use in the dunnage conversion system of FIG. 1 in accordance with the present invention.

As shown in FIGS. 2 and 3, the supply 12 of stock material can be provided in the form of a roll 30 of single-ply or multi-ply sheet stock material (FIG. 2) or in the form of a single-ply or multi-ply fan-folded stack 32 (FIG. 3). Whether the supply 12 is in roll or fan-folded form, either single-ply or multi-ply sheet material can be used. In a fan-folded stack 32, the sheet stock material 16 has a series of alternating folds that form a sequence of rectangular pages piled accordion-style one on top of another. In such a fan-folded stack 32, the rows 22 (FIG. 1) of perforations typically coincide with the fold lines in the stock material, but can be offset from the fold lines. Thus, the rows of perforations can be spaced more or less distance apart than the fold lines that form the rectangular pages of the fan-folded stack 32. The rows of perforations typically coincide with the fold lines, however, because they make it easier to fold the stock material at the row.

In a roll of sheet stock material, the stock material can be drawn from the outer surface of the roll, typically allowing the roll to rotate or turn as the stock material is drawn therefrom. Alternatively, the stock material can be drawn from the center of the roll.

An exemplary sheet stock material 16 for the supply 12 is kraft paper. Other stock materials include printed paper, bleached paper, newsprint, recycled paper, plastic and combinations thereof, for example. The perforations can be formed in the stock material 16 before it is supplied to a dunnage conversion machine 14 or can be formed in the stock material 16 by a component within the dunnage conversion machine 14.

The system 10 is not limited to one type of conversion machine. Different types of dunnage conversion machines 14 can be used in the system 10 to convert the stock material 16 into a relatively less dense dunnage product 20. Several examples are shown in FIGS. 4-6.

Figure 4:
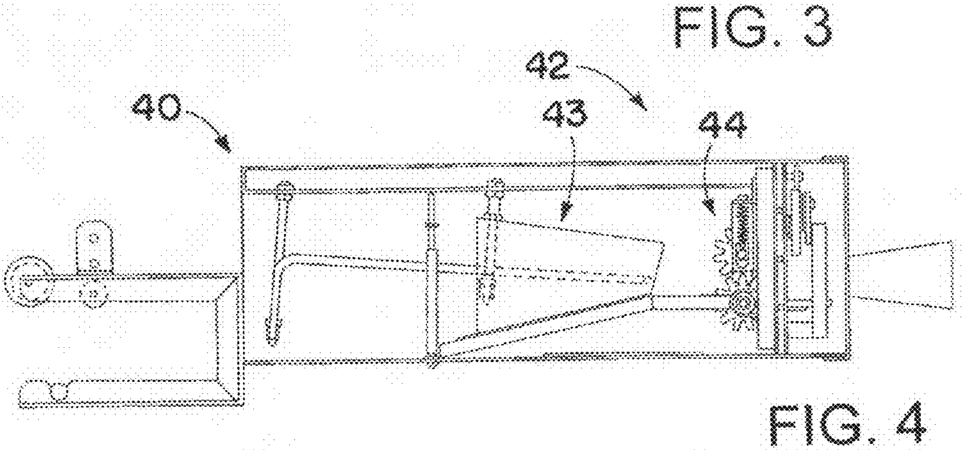
FIGS. 4-6 are schematic side views of exemplary dunnage conversion machines that can be used in the system of FIG. 1 in accordance with the present invention.

The dunnage conversion machine 40 shown in FIG. 4 includes a conversion assembly 42 having a forming assembly 43, and a feeding/fixing assembly 44 that feeds the stock material through the forming assembly. The forming assembly 43 turns lateral edges of the sheet stock material inwardly and crumples the stock material as it is drawn therethrough. The feeding/fixing assembly 44 also connects overlapping layers of stock material to form a dunnage product with lateral pillow portions spaced on either side of a connecting portion where the layers of stock material are held together. The connecting portion helps to maintain the shape of the dunnage product as it is manipulated.

Figure 5:
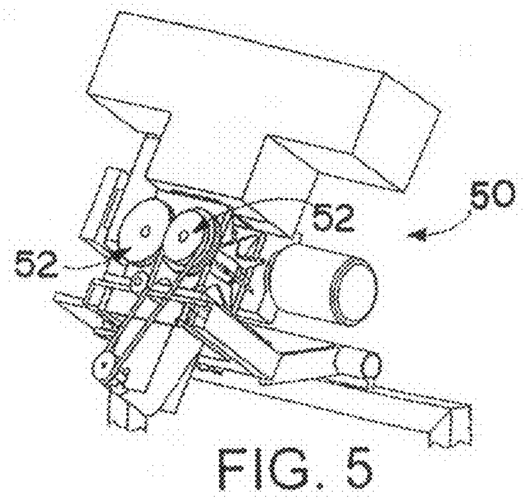

Another dunnage conversion machine 50 is shown in FIG. 5. In this dunnage conversion machine 50 a pair of grippers 52 laterally and transversely inwardly gather and crumple a sheet stock material as it moves through an aperture therebetween. This conversion machine 50 produces another type of dunnage product, which has undulating crumpled lobes.

Figure 6:
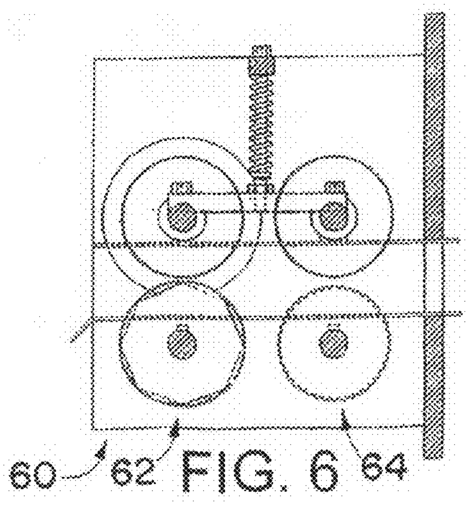

Still another type of conversion machine 60 is shown in FIG. 6. This dunnage conversion machine 60 includes upstream and downstream sets of rotating members 62 and 64. The downstream rotating members 64 feed the stock material therethrough at a slower rate than the rate at which the stock material is fed by the upstream rotating members 62. As a result, the stock material accumulates and longitudinally crumples therebetween before being passed through the downstream rotating members 64. This type of dunnage conversion machine 60 produces a relatively flatter dunnage product.

Other types of dunnage conversion machines or other means for converting the sheet stock material into a relatively less dense dunnage product can be used in place of the illustrated conversion machines 40, 50 and 60. For further details about dunnage conversion machines as shown or similar to the ones shown in FIGS. 4-6, reference may be had to the aforementioned U.S. Pat. Nos. 6,019,715; 6,277,459 and 6,676,589.

In the conversion process, many dunnage conversion machines pull the sheet stock material from the supply, and this pulling action tends to create tension in the stock material. Some conversion machines have had problems associated with excessive tension in the stock material, which cause the stock material to tear prematurely. This tearing can be unsightly, and in more extreme situations the torn stock material can jam in the conversion machine or lead to separation of a section of stock material at an undesirable location. Attempts have been made through various means to reduce the tension in the stock material as it enters a dunnage conversion machine. One potential solution is proposed in U.S. Pat. No. 6,758,801, the entire disclosure of which is incorporated herein by reference.

Instead of altering the machine to reduce tension, however, the stock material 16 described herein resists undesirable tearing while making it easier to separate a discrete dunnage product 20 from a strip of dunnage 18 produced by the conversion machine 14 (see FIG. 1). The perforations or other types of weakened areas are formed in predetermined regions of the stock material that typically are less prone to excessive tension and tearing in the course of a particular conversion process.

Figure 7:
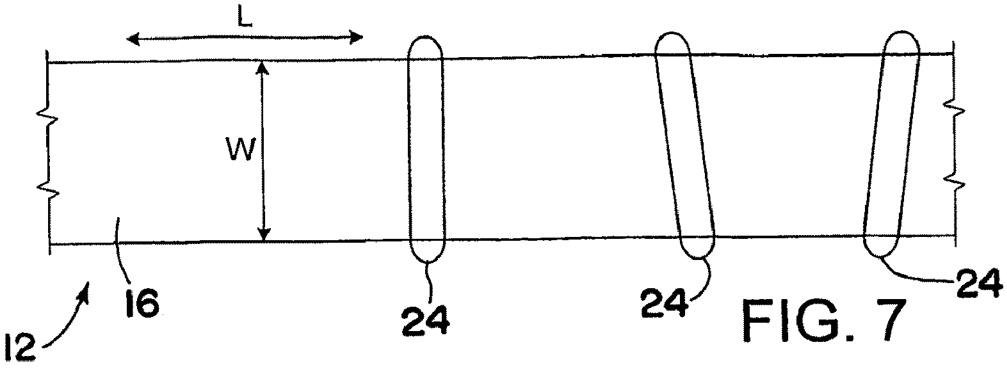
FIG. 7 is a schematic plan view of a length of sheet stock material in accordance with the present invention.

FIG. 7 shows an exemplary sheet stock material 16 with a plurality of rows 22 of weakened areas 24. The stock material 16 generally has a length L that is greater than its width W. In many conversion machines, the sheet stock material 16 typically is fed in a longitudinal direction parallel to a longitudinal dimension or length L of the stock material 16. The rows 22 described above extend along lines that extend across the width W the stock material 16. In all of the examples described herein, a row 22 that extends across the width W of the stock material 16 is not required to be perpendicular to the length or longitudinal direction L of the stock material 16. Generally, each row 22 will have a length that corresponds to the width W or other dimension transverse to the longitudinal direction L of the stock material 16.

As noted above, at least one parameter of the row is selectively varied across the stock material so that regions of the stock material that are prone to tearing are effectively strengthened relative to other regions across the stock material to better withstand the expected tension. Specifically, at least one of the following parameters can be varied within each row 22: (i) the manner of weakening each weakened area, (ii) the degree of weakening of each weakened area 24 within the row 22, (iii) the spacing of the weakened areas 24 within the row 22, (iv) the size of each weakened area 24 within the row 22, (v) the shape of each weakened area 24 within the row 22 or (vi) the orientation of each weakened area 24 within the row 22. The spacing can be determined by the pitch of the weakened areas. The pitch can be defined as the spacing between corresponding points of adjacent weakened areas.

Figure 8:
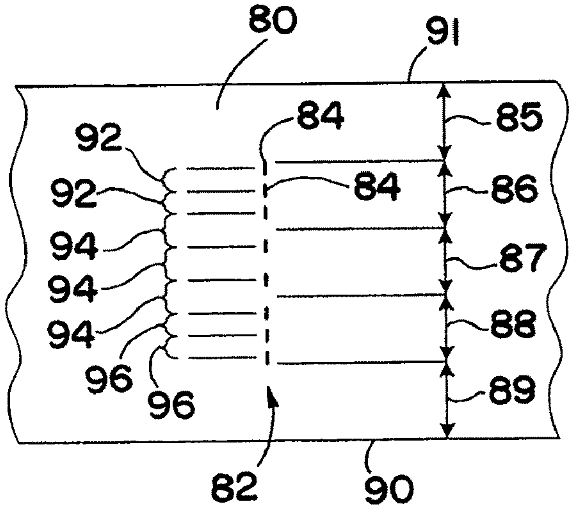
FIGS. 8-11 are schematic plan views of sections of sheet stock material in accordance with the present invention.

An exemplary stock material is shown in and will be described in detail with reference to FIG. 8. The sheet stock material 80 has a row 82 of weakened areas in the form of perforations 84 extending across the width of the stock material. The width of the stock material has been divided into five regions 85, 86, 87, 88 and 89. The outer regions 85 and 89 adjacent the lateral edges 90 and 91 of the stock material 80 are free of perforations, and the perforations 84 in the three central regions 86, 87 and 88 of the stock material have a variable spacing. In the central regions, the perforations 84 in each region have a different spacing. The spacing of the perforations within any two or all of the central regions, however, can be uniform. Thus the perforations in a first region 86 are spaced a first distance apart 92, the perforations 86 in a second region 93 are spaced a second distance apart 94, and the perforations 86 in a third region 95 are spaced a third distance apart 96. In the present example at least one, if not all three, of these distances 92, 94 and 96 is different from the others. The stock material adjacent each perforation, which is typically formed of a slit that has a much greater length than width, tends to tear at the ends of the perforations. A region where the perforations are placed closer together generally will be weaker and more likely to tear than a region where the perforations are farther apart or a region without perforations.

Figure 9:
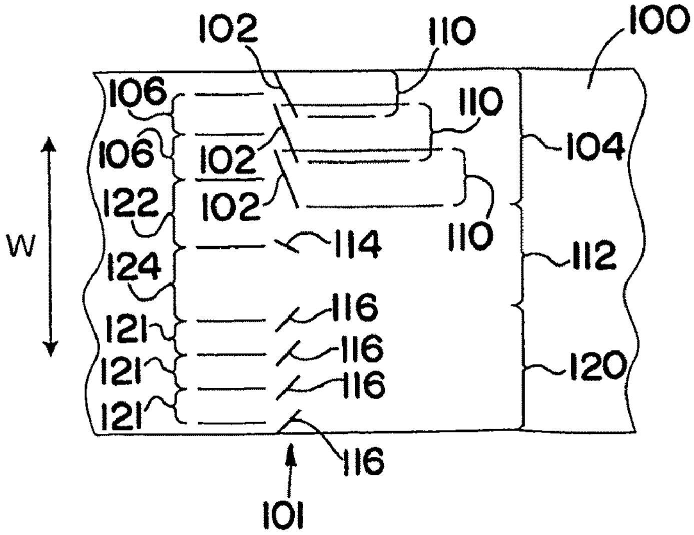

FIG. 9 shows another section of stock material 100 with a row 101 having a different type of perforation, one formed by angled slits 102. In this embodiment, a first region 104 near one edge of the stock material 100 includes slits 102 with a first spacing 106. The edges of the slits 102 longitudinally overlap, i.e., in a measurement of the lengths 110 of the slits 102 in a widthwise direction W relative to the stock material 100, the length measurements 110 of adjacent slits 102 overlap. Put another way, a line parallel to the longitudinal direction would pass through multiple slits in the row 101.

A central region 112 of the stock material 100 includes a single slit 114 whose angled inclination relative to the longitudinal dimension is different from that of the slits 102 in the first region 104. Finally, a series of slits 116 provided in a third region 120 of the stock material have a different orientation as well as a different spacing 121 relative to the other slits in that row 101. The single slit 114 in the central region 112 is spaced from adjacent slits 102 and 116 in the first and third regions 104 and 116 a distance 122 and 124, respectively, that is different from the spacing 106 and 121 of the slits 102 and 116 within the respective first and third regions 104 and 120. Consequently, the strength characteristics of the stock material 100 across the row 101 will be different in each region 104, 112 and 120.

The parameters of the rows 101 of weakened areas that vary in this row are the orientation and spacing of the weakened areas, or in this case slits 102 and 116. While a region with slits that are closer together will generally be weaker than a region where the slits are farther apart, the strength of the stock material across a row of angled slits also will depend on the direction of the applied tension. Slits weaken the stock material less (i.e. are less likely to tear) when the force is applied in a direction parallel to the slits than when the force is applied in a direction transverse the slits. Consequently, perforations, such as the illustrated angled slits 102, can be used to resist tearing from forces applied parallel to the slits while facilitating tearing due to forces applied across or transverse the length dimension of the slits.

Figure 10:
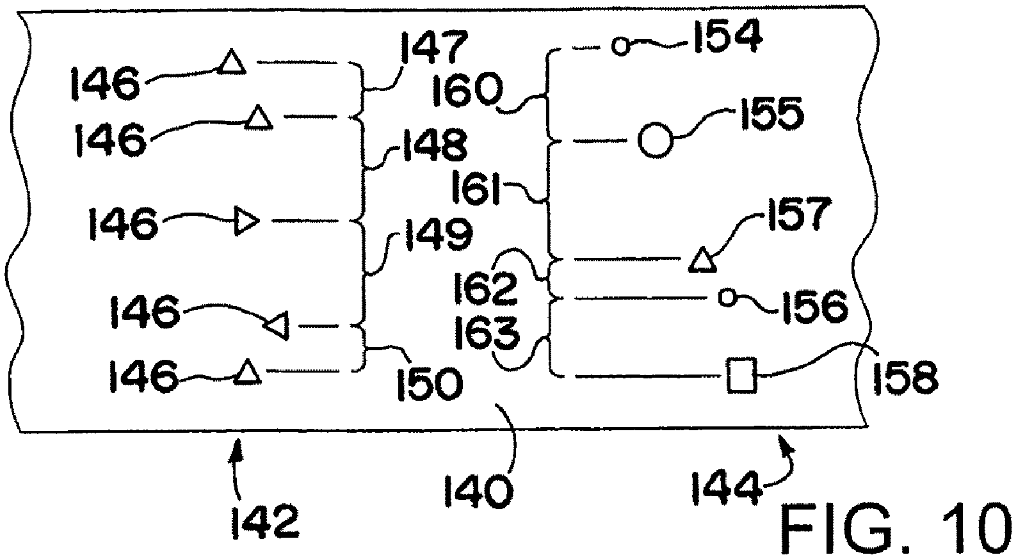

Finally, FIG. 10 shows another section of sheet stock material 140 with two rows 142 and 144 of weakened areas. In this embodiment, the weakened areas have several different shapes. In the first row 142, the weakened areas 146 have triangular shapes. The triangular-shape weakened areas 146 have variable spacing 147, 148, 149, 150 and variable orientation. Spacing and orientation are the varying parameters in this row 142. A triangular weakened area, for example, is more likely to allow a tear to form and propagate from a corner of the triangular shape. Consequently, in the context of the present invention a row 22 of weakened areas 24 can include uniformly-spaced triangular weakened areas that provide variable strength by virtue of changes in the orientation of the weakened areas. Moreover, even though the weakened areas in the first row 142 are not arrayed in a perfectly straight line they still form a row.

In the second row 144 the weakened areas have different shapes, including different size circles 154, 155, 156, a triangle 157 and a square 158. A larger shape generally weakens the stock material more than a smaller shape. While triangles and squares are more likely to tear from their corners, circles are equally likely to tear from any side, depending on the direction of the applied forces. The weakened areas in the second row 144 also have variable spacing 160, 161, 162, 163 in addition to the different sizes and shapes. Thus the varying parameters of this row 144 are the spacing, sizes and shapes of the weakened areas.

Figure 11:
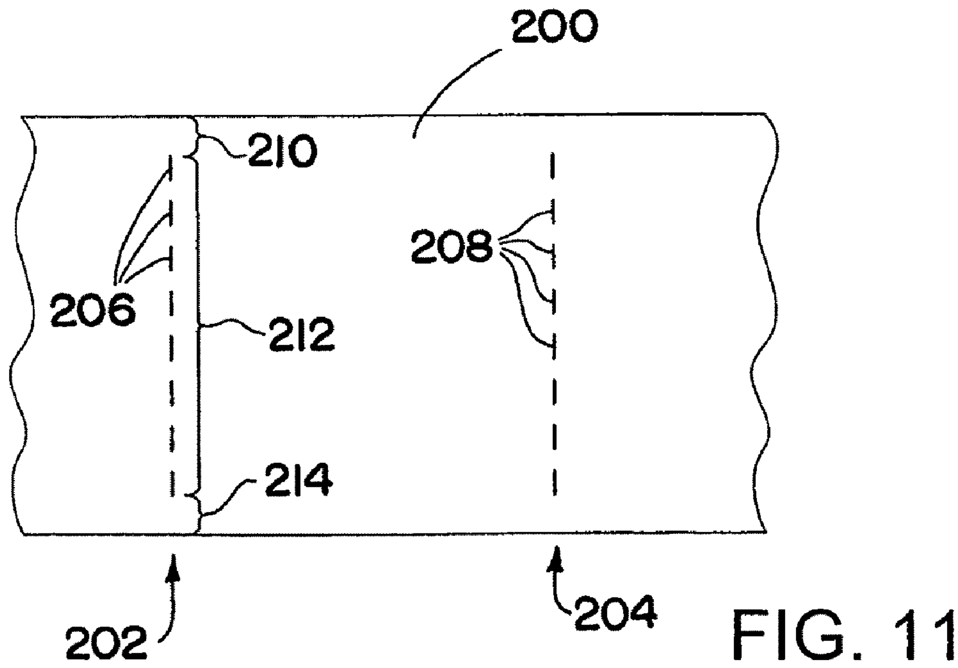

FIG. 11 shows another exemplary sheet stock material 200 which is similar to that described with reference to FIG. 8. The stock material 200 includes a plurality of longitudinally-spaced rows 202 and 204 of weakened areas. A series of perforations 206 and 208 define the respective rows 202 and 204 of weakened areas across the width of the stock material. Each row 202 and 204 of perforations can be divided into three regions 210, 212 and 214 along its length. The perforations in the central region 212 are substantially uniformly sized, shaped and spaced across the width of the stock material 200. The lateral edges of the stock material, regions 210 and 214, have a length of approximately ¼ inch to 1½ inches (about 0.5 cm to about 3.75 cm), and more particularly approximately ½ inch to 1 inch (about 1.25 cm to about 2.5 cm), and are free of perforations. These perforation-free regions 210 and 214 prevent or minimize tears from forming at the lateral edges of the stock material 200 and propagating inwardly from the edges. Thus, in a conversion machine that creates more tension in lateral portions 210 and 214 of the stock material, this stock material 200 can improve the performance of the conversion process because it resists tearing at its edges.

In view of the variations in parameters of the rows of weakened areas disclosed herein, other variations in the parameters of the rows of weakened areas will be apparent to a person of ordinary skill in the art consistent with the present invention.

A method of making a dunnage product using such a stock material typically does not require any change in operation of a dunnage conversion machine. Consequently, the method can include providing a stock material as described herein to a dunnage conversion machine, and converting the stock material into a dunnage product in the usual manner. The dunnage conversion machine typically will convert the stock material into a relatively less dense strip of dunnage from which an operator can manually separate a discrete dunnage product by tearing the stock material across a row, which is a reason why a row of weakened areas can be referred to as a tear line.

A method of making the stock material for conversion into a dunnage product includes the step of weakening a stock material to form weakened areas in a row extending across the width of the stock material to provide particular performance characteristics that enhance or inhibit tearability at particular locations relative to the weakened areas. Each row of weakened areas has at least one parameter that varies along the row. Therefore strength of the stock material, in response to a force applied across the row, varies across the stock material. The weakened stock material can then be converted into a relatively less dense dunnage product. The weakening step can include perforating the stock material such that the perforations have one of the varying parameters discussed herein, and thus are not uniform across the full width of the stock material.

Although the invention has been shown and described with respect to certain illustrated embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer that performs the specified function (i.e., that is functionally equivalent), even though not structurally equivalent to the disclosed structure that performs the function in the herein illustrated embodiments of the invention. In addition, while a particular feature of the invention might have been described above with respect to only one of several illustrated embodiments, such a feature can be combined with one or more other features of another embodiment, as might be desired and advantageous for any given or particular application.

What is claimed:

1. A stock material for a dunnage conversion machine comprises at least one ply of sheet material having a plurality of transversely-extending, longitudinally spaced-apart rows of weakened areas, where the weakened areas have a reduced strength relative to adjacent portions of the sheet material, and each row of weakened areas has at least one parameter that varies along the row, whereby the strength of the stock material at the row, in response to a force applied across the row, varies across the stock material, wherein each ply has lateral edge portions that are substantially free of weakened areas, and at least one ply includes paper; wherein the weakened areas include one or more perforations and at least one edge of the stock material is free of perforations for approximately 0.6 cm to 3.8 cm (approximately ¼ inch to 1½ inches) along each row of weakened areas.

2. A stock material as set forth in claim 1, wherein the at least one parameter that varies includes at least one of the manner in which each weakened area is weakened, the degree to which each weakened area is weakened, the spacing of the weakened areas within the row, the size of each weakened area within the row, the shape of each weakened area within the row or the orientation of each weakened area within the row.

3. A stock material as set forth in claim 1, wherein the spacing of at least three perforations is uniform.

4. A stock material as set forth in claim 1, wherein the perforations in at least two different rows have different parameters.

5. A stock material as set forth in claim 1, wherein the stock material includes a material selected from a group consisting of kraft paper, plastic, printed paper, bleached paper, newsprint, recycled paper and combinations thereof.

6. A stock material as set forth in claim 1, wherein the stock material includes multiple plies, and each ply has lateral edge portions that are substantially free of weakened areas.

7. A stock material as set forth in claim 6, wherein each ply is perforated only in a central portion of the ply between the lateral edge portions.

8. A stock material as set forth in claim 1, wherein the at least one ply includes a series of alternating folds that form a sequence of rectangular pages that are piled accordion-style one on top of another to form a stack of fan-folded stock material.

9. A stock material as set forth in claim 8, wherein the fold lines coincide with the tear lines.

10. A stock material as set forth in claim 1, wherein at least one row is substantially perpendicular to a longitudinal dimension of the stock material.

* * * * *